US009616725B2

(12) United States Patent
Kuroda

(10) Patent No.: US 9,616,725 B2
(45) Date of Patent: Apr. 11, 2017

(54) SUSPENSION ARM MEMBER

(71) Applicant: NHK SPRING CO., LTD., Yokohama, Kanagawa (JP)

(72) Inventor: Shigeru Kuroda, Yokohama (JP)

(73) Assignee: NHK SPRING CO., LTD., Yokohama, Kanagawa (JP)

( * ) Notice: Subject to any disclaimer, the term of this patent is extended or adjusted under 35 U.S.C. 154(b) by 0 days.

(21) Appl. No.: 15/021,727

(22) PCT Filed: Oct. 2, 2013

(86) PCT No.: PCT/JP2013/076840
§ 371 (c)(1),
(2) Date: Mar. 14, 2016

(87) PCT Pub. No.: WO2015/049739
PCT Pub. Date: Apr. 9, 2015

(65) Prior Publication Data
US 2016/0229247 A1    Aug. 11, 2016

(51) Int. Cl.
*B60G 7/00* (2006.01)
(52) U.S. Cl.
CPC ............. *B60G 7/001* (2013.01); *B60G 7/005* (2013.01); *B60G 2204/1224* (2013.01);
(Continued)
(58) Field of Classification Search
CPC .. B60G 7/001; B60G 7/005; B60G 2204/416; B60G 2204/1224; B60G 2206/10; B60G 2206/7101; B60G 2206/11
See application file for complete search history.

(56) References Cited

U.S. PATENT DOCUMENTS

| 1,770,644 A | 7/1930 | Hartog |
| 6,749,360 B2 * | 6/2004 | Abels ................... B60G 7/001 280/124.134 |

(Continued)

FOREIGN PATENT DOCUMENTS

| EP | 0 176 934 A1 | 4/1986 |
| JP | 2005-113952 A | 4/2005 |

(Continued)

OTHER PUBLICATIONS

International Search Report & Written Opinion dated Oct. 29, 2013 corresponding to International Patent Application No. PCT/JP2013/076840 and English translation thereof.

*Primary Examiner* — Darlene P Condra
(74) *Attorney, Agent, or Firm* — Squire Patton Boggs (US) LLP

(57) ABSTRACT

A suspension arm member includes a connecting portion configured to connect plural members of a suspension, and a support bar extending and provided with the connecting portion at each end. The support bar is made of a resin material and includes plural lightening hole portions each formed in a shape of a recessed portion. The lightening hole portions include plural front upper lightening hole portions (11) formed in a front upper portion of the support bar, plural front lower lightening hole portions formed in a front lower portion of the support bar, plural rear upper lightening hole portions formed in a rear upper portion of the support bar, and plural rear lower lightening hole portions formed in a rear lower portion of the support bar.

8 Claims, 6 Drawing Sheets

(52) U.S. Cl.
CPC .... *B60G 2204/416* (2013.01); *B60G 2206/10* (2013.01); *B60G 2206/11* (2013.01); *B60G 2206/7101* (2013.01)

(56) References Cited

U.S. PATENT DOCUMENTS

| | | | |
|---|---|---|---|
| 9,050,759 B2* | 6/2015 | Boveroux | B29C 70/84 |
| 9,321,317 B2* | 4/2016 | Gleason | B60G 7/001 |
| 2007/0272051 A1 | 11/2007 | Kamei et al. | |
| 2009/0202291 A1 | 8/2009 | Budde | |
| 2016/0152127 A1* | 6/2016 | Inatomi | F16F 15/08 |
| | | | 248/674 |
| 2016/0176279 A1* | 6/2016 | Inatomi | F16F 1/3849 |
| | | | 248/638 |

FOREIGN PATENT DOCUMENTS

| | | | |
|---|---|---|---|
| JP | 2009243483 A1 * | 10/2009 | |
| JP | 2009-541680 A | 11/2009 | |

* cited by examiner

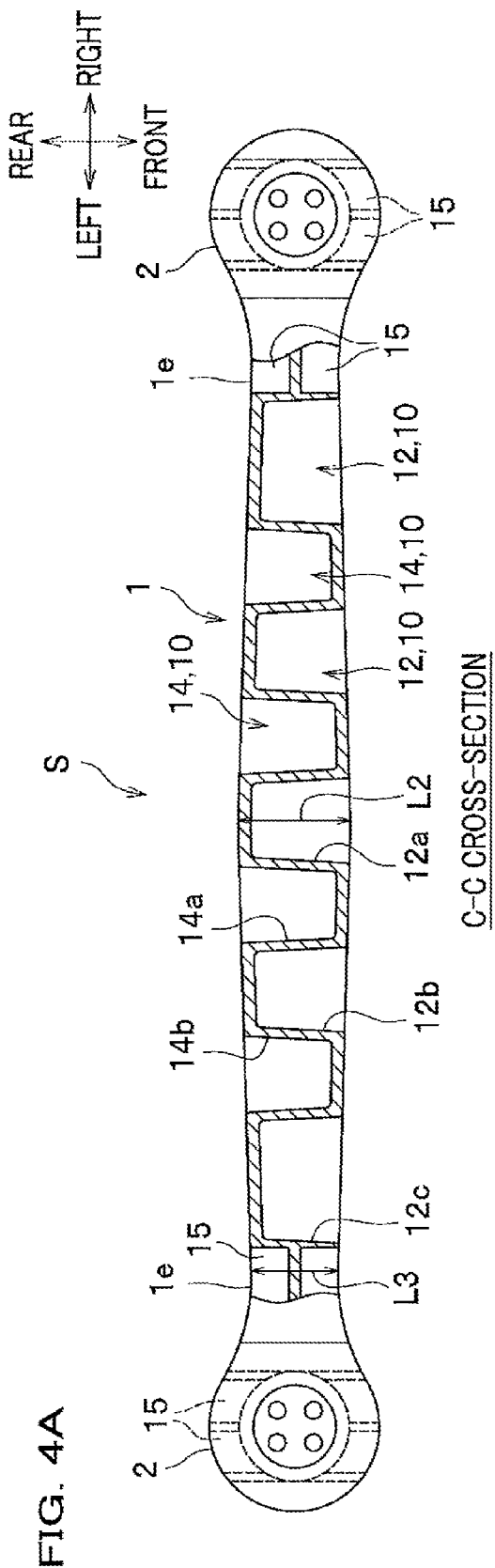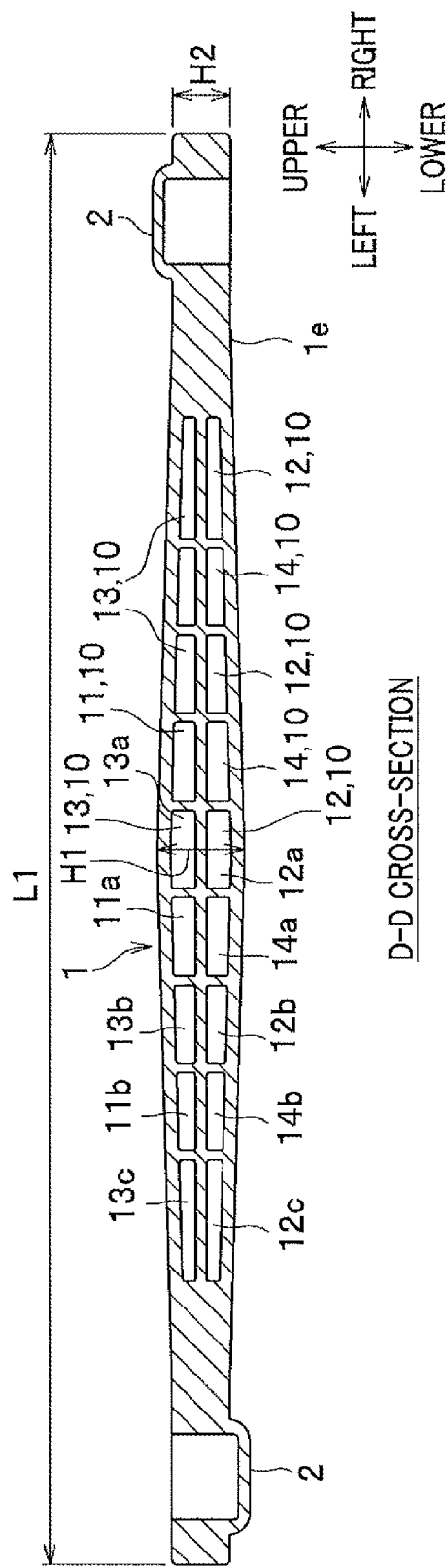

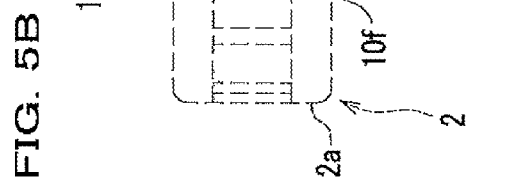
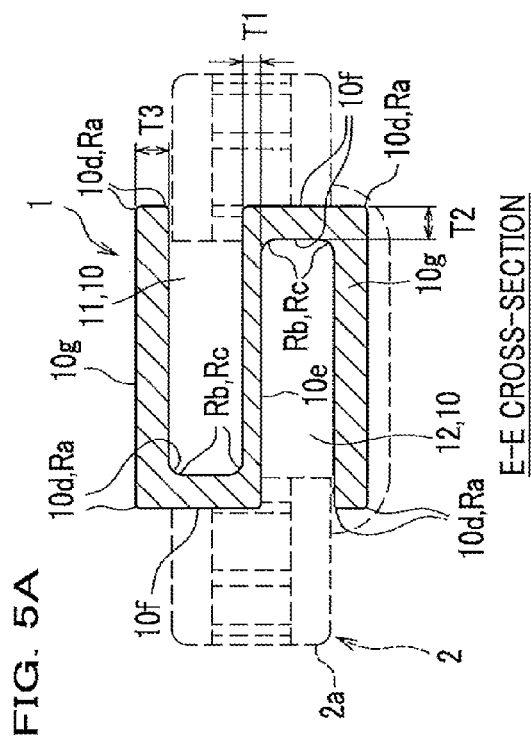
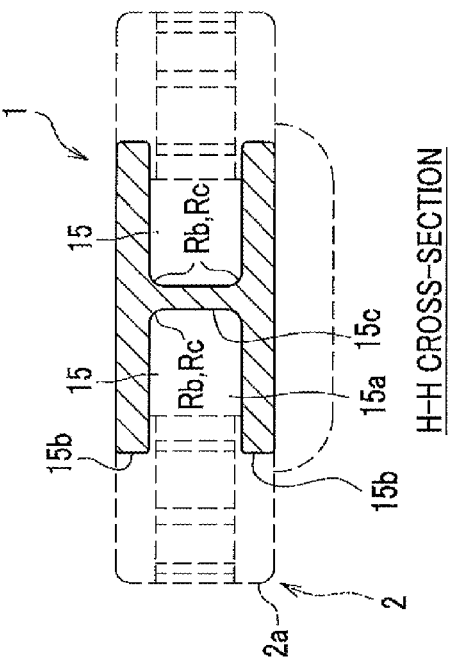
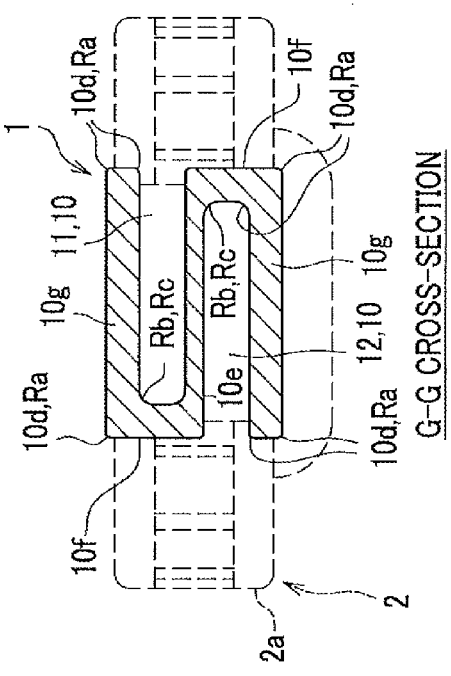

FIG. 6
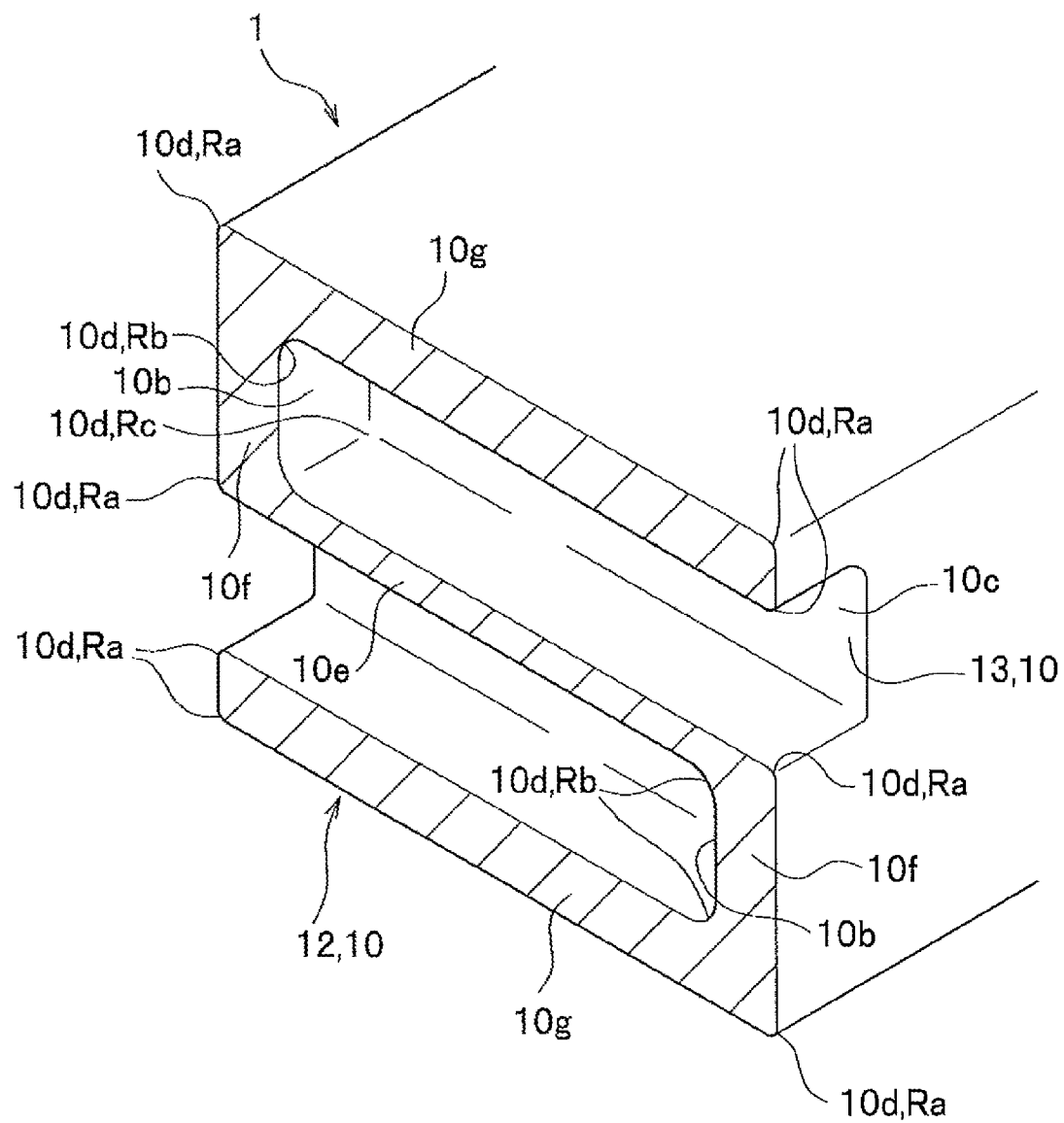
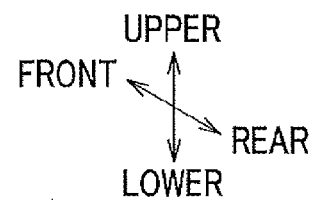

SUSPENSION ARM MEMBER

TECHNICAL FIELD

The present invention relates to a suspension arm member which is utilized for connecting plural members in a suspension mounted on a vehicle.

BACKGROUND ART

Heretofore, in a suspension mounted on an automobile, one member has been connected to another member in a vertically or otherwise swingable manner with a suspension arm member interposed in between. Examples of the suspension arm member include a suspension arm mounted to a vehicle body or an axle by a ball joint, and a stabilizer link connecting a strut and a stabilizer. Such a suspension arm member is required to have strength or rigidity, and thus, a suspension arm member made of iron is generally used. A typical stabilizer link is heavier in weight due to its support bar made of steel, as compared to a member made of a resin or a member made of aluminum.

Recently, in the field of automobiles, there has been a growing demand for an improvement in fuel economy because of a steep rise in crude oil and gasoline prices or the like, and there has been a demand for a weight reduction of the vehicle body for purposes of the improvement in the fuel economy. A plastic pendulum support disclosed in Patent Literature 1, for example, is known as the suspension arm member whose weight is reduced in order to reduce the weight of the vehicle body.

The plastic pendulum support (or the suspension arm member) disclosed in Patent Literature 1 has eight intermediate chambers in total by forming four longitudinally-elongate intermediate chambers in front and rear lateral sides, respectively, of a base body made of plastic.

The intermediate chambers include a pair of front lateral central intermediate chambers disposed in a central lower side of the front lateral side of the plastic pendulum support, a pair of front lateral outside intermediate chambers disposed at left and right outside upper symmetrical positions, respectively, with respect to the pair of front lateral central intermediate chambers, a pair of rear lateral upper central intermediate chambers disposed in a central upper side of the rear lateral side, and a pair of rear lateral outside upper intermediate chambers disposed at left and right outside lower symmetrical positions, respectively, with respect to the pair of rear lateral upper central intermediate chambers.

In the plastic pendulum support, the four longitudinally-elongate intermediate chambers are formed in the front and rear lateral sides, respectively, in an S-shape as seen in a vertical sectional view in a widthwise direction, thereby improving cross-sectional secondary moment and load resistance capability of the entire construction.

CITATION LIST

Patent Literature

Patent Literature 1: JP 2009-541680 A

SUMMARY OF INVENTION

Technical Problem

However, there is a demand for further reductions in weight and manufacturing cost, although in the plastic pendulum support disclosed in Patent Literature 1, the four intermediate chambers (or intermediate spaces) are formed in the front lateral side and the rear lateral side, respectively, and are manufactured from plastic thereby to achieve a weight reduction and a manufacturing cost reduction.

Moreover, in the plastic pendulum support, the base body is not formed in a vertically symmetrical shape about a centerline, as seen in a side view, and thus, if an automobile travels with the plastic pendulum support mounted thereon, the plastic pendulum support is subjected to loads from multiple directions and hence undergoes irregular deformation without becoming deformed in a vertically symmetrical shape. For example, if the plastic pendulum support is used as the stabilizer link in the automobile, the plastic pendulum support rotates in a forward or reverse direction about a longitudinally extending axis, which thus requires a space for a circumscribed circle around the plastic pendulum support. Thus, if auxiliary machinery or the like is disposed around the stabilizer link, the plastic pendulum support abuts against the auxiliary machinery or the like, which in turn requires a space for avoiding such abutting and hence leads to the problem of making it difficult to design a vehicle layout.

Moreover, in the plastic pendulum support, the intermediate chambers formed in the support bars between receiving elements on both ends are formed in square-shaped spaces by three upper, middle and lower transverse webs (or ribs) and two coupling portions. This leads to the problem of making it difficult to remove mud and sand or the like if the mud and sand or the like is deposited on the intermediate chambers at their backs and corners.

Moreover, in the plastic pendulum support, the three upper, middle and lower transverse webs in the form of flat plates are arranged parallel to one another, and thus, the plastic pendulum support has the problem of being weak against the behavior of axial displacement of the upper and lower transverse webs, although being strong against a compression force from a direction orthogonal to the axis.

Moreover, the plastic pendulum support has the problem that stresses are prone to concentrate at the points of intersection of the transversely-formed transverse webs and vertically-formed coupling webs and hence acute-angled corners are prone to break.

Therefore, the present invention has been made in order to overcome the foregoing problems. An object of the present invention is to provide a suspension arm member which is lighter in weight and higher in strength.

Solution to Problem

To solve the above problems, the present invention provides a suspension arm member including: a connecting portion configured to connect plural members of a suspension mounted on a vehicle; and a support bar provided with the connecting portion at each end and extending in a longitudinal direction, wherein the support bar is made of a resin material and includes plural lightening hole portions each formed in a shape of a recessed portion in a direction orthogonal to the longitudinal direction, and the lightening hole portions include plural front upper lightening hole portions formed in the longitudinal direction in a front upper portion of the support bar, plural front lower lightening hole portions formed in the longitudinal direction in a front lower portion of the support bar and staggered in a top-to-bottom direction with respect to the front upper lightening hole portions, plural rear upper lightening hole portions formed in the longitudinal direction in a rear upper portion of the support bar and staggered in a front-to-rear direction with respect to the front upper lightening hole portions, and plural rear lower lightening hole portions formed in the longitudinal direction in a rear lower portion of the support bar and staggered with respect to the rear upper lightening hole portions and the front lower lightening hole portions.

Note that the terms "top-to-bottom direction," "upper" and "lower" as employed herein refer to arbitrary directions, and a widthwise direction with respect to a surface in which the lightening hole portions are formed is defined as the top-to-bottom direction. Also, the terms "front-to-rear direction," "front" and "rear" refer to arbitrary directions, and a depth direction in which the lightening hole portions each in the shape of the recessed portion are formed is defined as the front-to-rear direction.

According to such a configuration, the suspension arm member includes the plural lightening hole portions each formed in the shape of the recessed portion and is made of the resin material, thus enabling a weight reduction. The lightening hole portions include the front upper lightening hole portions formed in the front upper portion of the support bar, the front lower lightening hole portions formed in the front lower portion of the support bar and staggered in the top-to-bottom direction with respect to the front upper lightening hole portions, the rear upper lightening hole portions formed in the rear upper portion of the support bar and staggered with respect to the front upper lightening hole portions, and the rear lower lightening hole portions formed in the rear lower portion of the support bar and staggered with respect to the rear upper lightening hole portions and the front lower lightening hole portions. Thus, the suspension arm member includes the arrangement of the lightening hole portions formed in the front and the rear of the support bar and staggered in the top-to-bottom direction and in the longitudinal direction, which in turn enables reducing the resin material for the support bar by the amount of lightening and hence achieving a cost reduction and a weight reduction and also enables an improvement in strength by a partition part in which the lightening hole portions are formed.

Preferably, moreover, parts of the support bar in which the lightening hole portions are formed are formed in substantially an S-shape or in substantially an inverted S-shape, as seen in a cross-sectional view in a widthwise direction.

According to such a configuration, in the support bar, the parts in which the lightening hole portions are formed are formed in substantially the S-shape or in substantially the inverted S-shape, as seen in the cross-sectional view in the widthwise direction, which thus enables an improvement in rigidity of the lightening hole portions.

Preferably, moreover, the parts in which the lightening hole portions are formed include an intermediate plate portion disposed in a central portion as seen in the cross-sectional view in the widthwise direction, rib portions formed so as to extend in opposite directions from ends of the intermediate plate portion in a direction orthogonal to the intermediate plate portion, and wing portions formed so as to extend from distal ends of the rib portions and parallel to a direction orthogonal to the rib portions, and the lightening hole portions are formed so that the following equation is satisfied: $T1<T3<T2$, where $T1$ represents a plate thickness of the intermediate plate portion, $T2$ represents a plate thickness of the rib portion, and $T3$ represents a plate thickness of the wing portion.

According to such a configuration, the lightening hole portions are formed so that the plate thickness $T1$ of the intermediate plate portion, the plate thickness $T2$ of the rib portion and the plate thickness $T3$ of the wing portion satisfy the following equation: $T1<T3<T2$, and thus, during resin molding, resin fluidity can be applied to requirements for higher strength. Thus, the support bar having rigidity can be achieved.

Preferably, moreover, the lightening hole portions are provided with sidewalls, and the sidewalls are formed so as to extend from openings to inner bottom portions of the lightening hole portions and so as to have an angle of inclination such that the sidewalls are expanded to the openings.

According to such a configuration, in the lightening hole portions, the sidewalls formed extending from the openings to the inner bottom portions are formed so as to have the angle of inclination such that the sidewalls are expanded to the openings in a fan shape as seen in the cross-sectional view, which thus enables easy removal of a mold after the resin molding and also enables easy elimination of mud and sand or the like which has entered into the lightening hole portions.

Preferably, moreover, the sidewalls are formed so that the sidewalls are expanded in an opposite direction to the adjacent respective lightening hole portions.

According to such a configuration, the sidewalls of the lightening hole portions are expanded in the opposite direction to the adjacent respective lightening hole portions, which thus enables the resin molding so as to suppress the falling down of the wing portions at an open end side by a truss effect and also enables ensuring uniform strength in an axial direction.

Preferably, moreover, the angle of inclination includes any angle in a range of 91 to 100 degrees with respect to a centerline of the support bar in the longitudinal direction.

According to such a configuration, the angle of inclination of the sidewalls of the lightening hole portions is any angle in the range of 91 to 100 degrees, which thus enables easy removal of the mold after the resin molding and also enables easy elimination of mud and sand or the like which has entered into the lightening hole portions during the travel of the vehicle. Moreover, the sidewalls of the lightening hole portions are inclined so as to be expanded, which thus enables an improvement in strength of the support bar.

Preferably, moreover, corner portions of the lightening hole portions are rounded with their respective predetermined radii of curvature.

According to such a configuration, the corner portions of the lightening hole portions are rounded with their respective predetermined radii of curvature, which thus enables suppressing a situation where stresses concentrate at the corner portions and hence break the corner portions when other members collide against the corner portions.

Preferably, moreover, the resin material includes engineering plastic or super engineering plastic containing any of PA (polyamide) 66, PA 6, PPS (polyphenylene sulfide), and POM (polyoxymethylene).

According to such a configuration, the resin material is made of the engineering plastic or the super engineering plastic, which thus enables improvements in strength and heat resistance.

Preferably, moreover, the resin material includes a fiber reinforcement material added thereto.

According to such a configuration, the resin material includes the fiber reinforcement material added thereto, which thus enables improvements in rigidity and strength against temperature.

Advantageous Effects of Invention

According to the present invention, a suspension arm member which is lighter in weight and higher in strength can be provided.

BRIEF DESCRIPTION OF DRAWINGS

FIG. 4A is a cross-sectional view taken along the line C-C of FIG. 3A;

FIG. 4B is a cross-sectional view taken along the line D-D of FIG. 3B;

FIG. 5A is a cross-sectional view taken along the line E-E of FIG. 3A;

FIG. 5B is a cross-sectional view taken along the line F-F of FIG. 3A;

FIG. 5C is a cross-sectional view taken along the line G-G of FIG. 3A;

FIG. 5D is a cross-sectional view taken along the line F-F of FIG. 3A; and

FIG. 6 is an enlarged cross-sectional view of a principal part, showing a shape of a lightening hole portion.

DESCRIPTION OF EMBODIMENTS

Hereinafter, a suspension arm member S according to an embodiment of the present invention will be described with reference to FIGS. 1 to 6.

Figure 1:
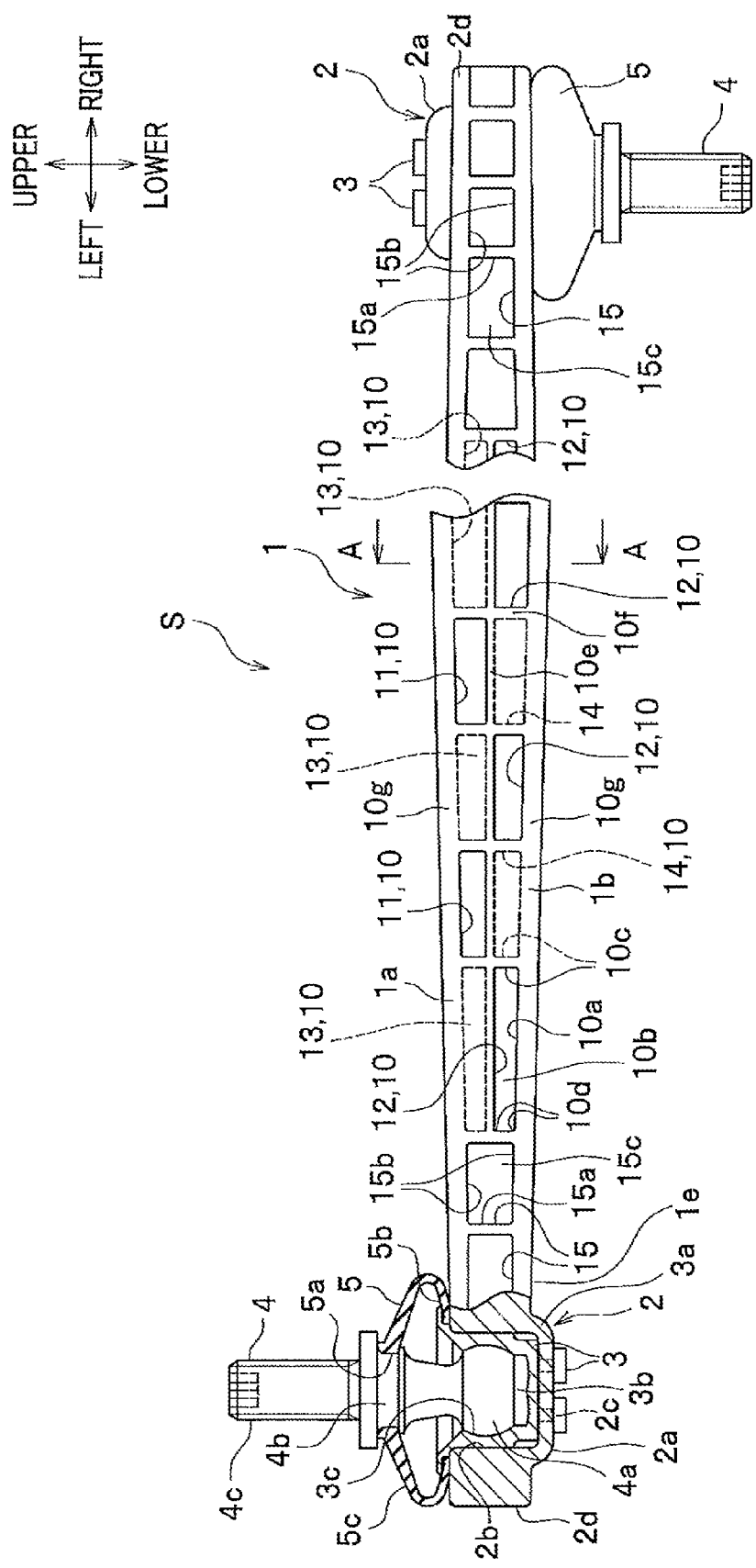
FIG. 1 is a front view with a partial cross section of a suspension arm member according to an embodiment of the present invention.

Note that the suspension arm member S shown in FIG. 1 changes its orientation according to its installed state in a vehicle or its mounted position. Thus, for the sake of convenience, description will be given below, provided that with reference to a case where a support bar 1 is disposed in a longitudinal direction in the suspension arm member S, a depth direction of lightening hole portions 10 formed in the support bar 1 is defined as a front-to-rear direction, a widthwise direction of the lightening hole portions 10 of the support bar 1 is defined as a top-to-bottom direction, and the sides on which connecting portions 2, 2 are disposed are defined as left and right.

(Configuration of Suspension)

Prior to description of the suspension arm member S according to the embodiment of the present invention, description will first be given with regard to a suspension (not shown) to which the present invention is applied.

The suspension (not shown) is a device configured to mount a vehicle body thereon in a vehicle such for example as an automobile, a motorcycle or an electric train and absorb vibrations from wheels, and includes the suspension arm member S.

(Configuration of Suspension Arm Member)

The suspension arm member S is an arm-shaped member provided in the suspension (not shown) mounted on the vehicle, and also includes a member called a link or a rod. The suspension arm member S is, for example, a suspension arm or a stabilizer link or the like. Any member may be adopted as the suspension arm member S as long as it has the support bar 1 to be described later and is used in the suspension (not shown), and the form, type and used location of the suspension or the like is not particularly limited. Hereinafter, the present invention will be described giving the case of the stabilizer link by way of example.

As shown in FIG. 1, the suspension arm member S is the arm-shaped (or link-shaped) member including a pair of connecting portions 2, 2 configured to connect plural members of the suspension mounted on the vehicle, and the support bar 1 provided with the connecting portions 2, 2 at its ends, respectively, and extending in the longitudinal direction. In the suspension arm member S, a ball seat 3 to be described later, a stud bolt 4 having a ball portion 4a rotatably provided within the ball seat 3, and a dust boot 5 for preventing dust or the like from entering the ball portion 4a are disposed in a housing portion 2a of the connecting portions 2, 2 at the ends.

For example, the suspension arm member S is formed so that its overall length L1 (see FIG. 4B) is of the order of 330 mm. The suspension arm member S is made of a resin material including so-called engineering plastic or super engineering plastic containing any of PA (polyamide) 66, PA 6, PPS (polyphenylene sulfide), and POM (polyoxymethylene). The resin material includes a fiber reinforcement material added thereto, and the fiber reinforcement material includes fine fibers such as glass fibers or carbon fibers, or the like, which thus improves strength. Preferably, the percentage of content of the fiber reinforcement material in the resin material is equal to or higher than 25% in order to prevent a reinforcement effect and a high-temperature (80° C.) strength from being equal to or less than 50%, as compared to normal temperature (23° C.). Moreover, an upper limit of the percentage of content of the fiber reinforcement material is set to about 60%, taking into account life of an injection molding machine as a matter of moldability.

As employed herein, the "engineering plastic" refers to high-performance plastic adaptable to structural and mechanical members, having a heat resistance of 100° C. or higher, a tensile strength of 50 MPa or higher, and a modulus of flexural elasticity of 2.4 GPa or higher. Also, the "super engineering plastic" refers to engineering plastic having higher heat resistance, which can be used over a long term even at a high temperature of 150° C. or more.

PA 66 is a polyamide-base resin and is also called nylon 66. PA 66 is a synthetic fiber and is also engineering plastic having higher crystallinity among the polyamide-base resins and having well-balanced physical properties, and PA 66 is superior in heat resistance and mechanical strength, as compared to PA 6. PA 66 is superior in balance of mechanical strength and chemical resistance, and has most excellent mechanical strength among nylon-base resins (or the polyamide-base resins). Moreover, PA 66 can be reinforced by a filler, and PA 66 can be filled with glass fibers or the like to greatly improve mechanical strength, rigidity, heat distortion temperature, or the like.

PA 6 is a polyamide resin and is also called nylon 6. PA 6 has a melting point of 225° C., a heat resistance temperature of 80 to 140° C., a specific gravity of 1.13 and a translucent white color, and is superior in wear resistance, cold proof resistance, shock resistance, oil resistance and alkali resistance.

PPS is a polyphenylene sulfide resin and is a high-performance resin having a molecular structure including a phenyl group (or a benzene cycle) and sulfur (S) repeatedly alternating with each other. PPS is a crystalline resin and is very high in heat resistance (or has a continuous enduring temperature of the order of 240° C.), and PPS is superior in heat resistance because of having a continuous enduring temperature of 200° C. to 220° C. and a load deflection temperature of 260° C. or higher under high load (1.82 MPa) and is high in tensile strength and flexural strength. PPS has a low shrinkage percentage of 0.3 to 0.5% during molding and has good dimensional stability. Moreover, PPS is superior in mechanical strength, rigidity, inflammability, chemical resistance, electrical properties, dimensional stability, and the like.

POM is polyacetal and is a crystalline resin having well-balanced mechanical properties and is extremely superior in fatigue resistance, in particular. POM is superior in friction resistance, wear resistance, chemical resistance, creep resistance and dimensional stability and is also low in water absorbability.

(Configuration of Support Bar)

As shown in FIGS. 4A and 4B, the support bar 1 is a rod-shaped part disposed between the connecting portions 2, 2 at the left and right ends, and is integrally formed with the connecting portions 2, 2 by the resin material. The support bar 1 includes the plural lightening hole portions 10 each formed in a shape of a recessed portion in a direction (or the front-to-rear direction) orthogonal to the longitudinal direction (or a left-to-right direction) and disposed in two upper and lower stages, and end lightening hole portions 15 formed in a row extending from the left and right sides of the lightening hole portions 10 to the connecting portions 2, 2 at the left and right ends, as seen in a front view.

For example, the support bar 1, as seen in a plan view, is formed so that a length L2 of a central portion in the front-to-rear direction is of the order of 26.2 mm and a length L3 of the end portion (or a neck portion 1e) close to the connecting portion 2 in the front-to-rear direction is 20.83 mm. In other words, the support bar 1 is formed longest in the central portion and narrowest in the end portion, so that its length gradually decreases from the central portion toward the end portions. For example, the support bar 1, as seen in a side view, is formed so that a height H1 of the central portion in the top-to-bottom direction is of the order of 19.6 mm and a height H2 of the left and right ends in the top-to-bottom direction is 15.40 mm. In other words, the support bar 1 is formed longest in the central portion and narrowest in the end portions, so that the support bar 1 becomes gradually narrower from the central portion toward the ends. Moreover, as shown in FIGS. 5A to 5C, in the support bar 1, all corner portions 10d at which plane surfaces such as the lightening hole portions 10 intersect one another are provided with curves Ra, Rb to be described later or a spherical curved surface Rc, and are rounded with their respective predetermined radii of curvature.

As shown in FIGS. 5B and 5C, parts of the support bar 1 in which the lightening hole portions 10 are formed are formed in substantially an S-shape or in substantially an inverted S-shape, as seen in a vertical sectional view. The parts of the support bar 1 in which the lightening hole portions are formed include an intermediate plate portion 10e, rib portions 10f, and wing portions 10g, to be described later. The support bar 1 is formed in substantially the S-shape or in substantially the inverted S-shape as seen in the vertical sectional view, and thus, the rib portions 10f and the wing portions 10g are disposed at positions at a distance away from a central axis in an X-axis direction and a Y-axis direction, as compared to a support bar having an I-shape as seen in the vertical sectional view. Thus, the support bar 1, if loaded by an external force, can distribute and elastically absorb the external force, which in turn enables suppressing an external dimension and hence achieving a size reduction.

(Configuration of Lightening Hole Portion)

As shown in FIG. 1, the lightening hole portions 10 are spaces each in a shape of a recessed portion as seen in a cross-sectional view, formed in the front and the rear of the support bar 1 and in outer peripheral surfaces of the connecting portions 2, 2, and the lightening hole portions 10 are formed for purposes of a weight reduction of the suspension arm member S. The lightening hole portions 10 include front upper lightening hole portions 11, front lower lightening hole portions 12, rear upper lightening hole portions 13, rear lower lightening hole portions 14, and the end lightening hole portions 15.

Figure 3A:
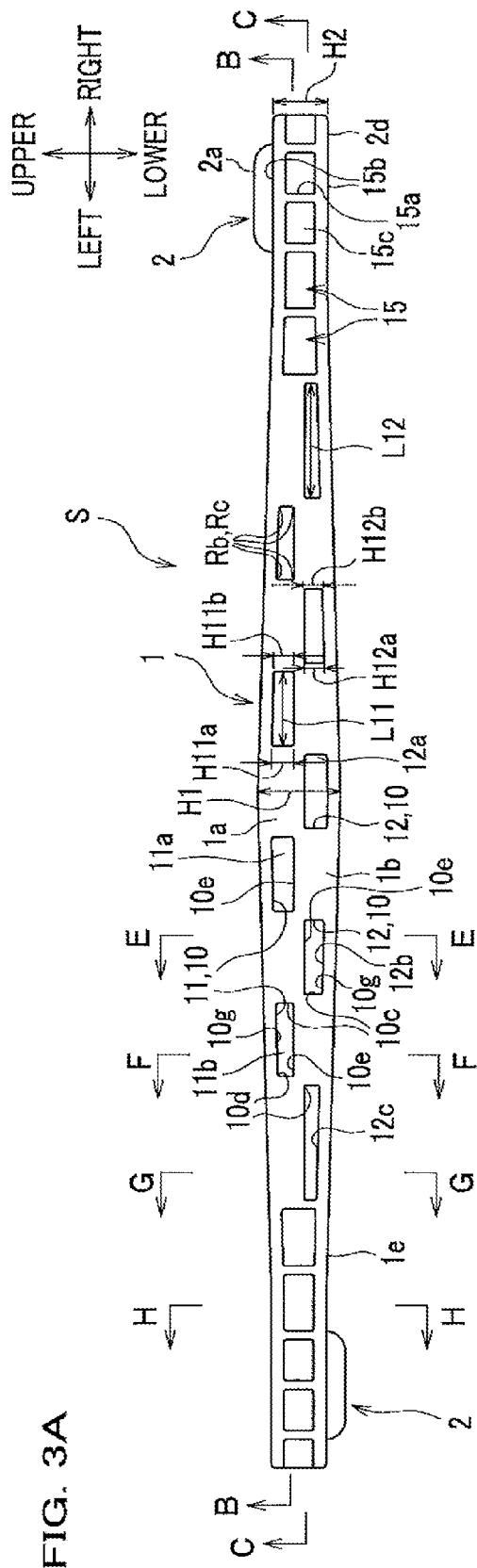
FIG. 3A is a side view of a support bar of the suspension arm member.
Figure 3B:
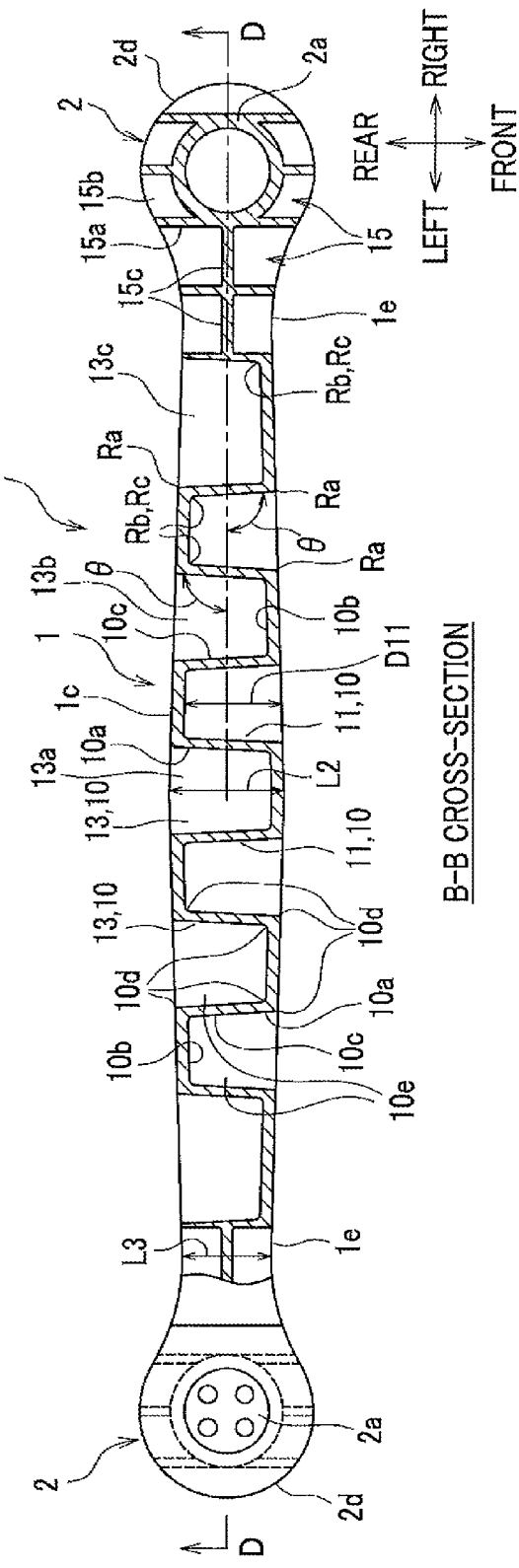
FIG. 3B is a cross-sectional view taken along the line B-B of FIG. 3A.

As shown in FIG. 3B, the lightening hole portions 10 are provided with sidewalls 10c, and the sidewalls 10c are formed so as to extend from openings 10a to inner bottom portions 10b of the lightening hole portions 10 and so as to have an angle $\theta$ of inclination such that the sidewalls 10c are expanded to the openings 10a in a fan shape as seen in the cross-sectional view. The angle $\theta$ of inclination is formed as any angle in a range of 91 to 100 degrees with respect to a centerline of the support bar 1 in the left-to-right (or longitudinal) direction. Thus, the lightening hole portions 10 are formed so as to expand so that their bore diameters become gradually larger from the inner bottom portions 10b toward the openings 10a.

In FIGS. 1, 3B and 4B, for the sake of convenience, the openings 10a and the sidewalls 10c are represented as straight lines and are omitted; however, actually, there is an offset (or a step) between an open end and a bottom end of the opening 10a.

(Configuration of Front Upper Lightening Hole Portion)

As shown in FIG. 3A, the front upper lightening hole portions 11 include the four lightening hole portions 10 formed in a row in the longitudinal direction in a front upper portion 1a of the support bar 1, at spaced intervals for disposition such that the rear upper lightening hole portions 13 (see FIG. 1) can be formed. The front upper lightening hole portions 11 include a pair of first front upper lightening hole portions 11a and a pair of second front upper lightening hole portions 11b, and these pairs are symmetrically disposed in the left-to-right direction. The pair of first front upper lightening hole portions 11a are disposed at left and right positions close to the central portion with respect to the central portion in the left-to-right (or longitudinal) direction, and the pair of second front upper lightening hole portions 11b are disposed at positions close to the connecting portions 2, 2 of the pair of first front upper lightening hole portions 11a. Lengths L11 of the four front upper lightening hole portions 11 in the left-to-right direction are all the same and are 20 mm, for example.

The front upper lightening hole portions 11 are formed so that heights H11a, H11b of the four front upper lightening hole portions 11 in the top-to-bottom direction decrease proportionally according to a gradual decrease in a height dimension of the support bar 1 from the height H1 of the central portion in the top-to-bottom direction toward the height H2 of the end portions. Each front upper lightening hole portion 11 is formed so that the height H11a close to the central portion of the support bar 1 is greater than the height H11b close to the connecting portions 2, 2, and thus, each front upper lightening hole portion 11 is formed in a trapezoidal shape which is long in a transverse direction. In other words, each front upper lightening hole portion 11 is formed so as to be inclined so that the upper wing portion 10g becomes lower with respect to the horizontally-extending intermediate plate portion 10e from the central portion of the support bar 1 toward the connecting portions 2, 2.

The four front upper lightening hole portions 11 formed in this manner include the symmetrical formation and disposition of the two front upper lightening hole portions 11 disposed on the left side and the two front upper lightening hole portions 11 disposed on the right side, with respect to the central portion of the support bar 1 in the longitudinal direction.

As shown in FIG. 3B, the front upper lightening hole portions 11 are formed so that in the support bar 1, the length L2 of the central portion in the front-to-rear direction is the longest length and the length L3 of the neck portion 1e in the front-to-rear direction is the shortest length. Thus, a depth D11 of the front upper lightening hole portions 11 disposed at the positions close to the central portion is formed greater than the depth D11 of the front upper lightening hole portions 11 disposed close to the neck portion 1e.

(Configuration of Front Lower Lightening Hole Portion)

As shown in FIGS. 3A and 3B, the front lower lightening hole portions 12 include the five lightening hole portions 10 formed in the longitudinal direction in a front lower portion 1b of the support bar 1 and staggered in the top-to-bottom direction with respect to the front upper lightening hole portions 11. The front lower lightening hole portions 12 are formed in a row from the central portion of the support bar 1 in the longitudinal direction, at spaced intervals for disposition such that the rear lower lightening hole portions 14 (see FIG. 4A) can be formed. The front lower lightening hole portions 12 include a first front lower lightening hole portion 12a disposed in the central portion in the longitudinal direction, a pair of second front lower lightening hole portions 12b disposed at positions close to the connecting portions 2, 2 on the left and right of the first front lower lightening hole portion 12a, and a pair of third front lower lightening hole portions 12c disposed at positions close to the connecting portions 2, 2 on the left and right of the second front lower lightening hole portions 12b, and these portions 12a, 12b and 12c are symmetrically disposed in the left-to-right direction with respect to the central portion in the longitudinal direction. The five front lower lightening hole portions 12 are formed so that lengths, in the left-to-right direction, of the first front lower lightening hole portion 12a and the second front lower lightening hole portions 12b disposed at positions close to the central portion are the same as the length L11 of the front upper lightening hole portions 11, and the third front lower lightening hole portions 12c disposed closest to the connecting portions 2, 2 have a length L12 (for example, 30 mm) which is greater than the length L11.

In the same manner as the front upper lightening hole portions 11, the front lower lightening hole portions 12 are formed so that heights H12a, H12b of the five front lower lightening hole portions 12 in the top-to-bottom direction decrease proportionally according to the gradual decrease in the height dimension of the support bar 1 from the height H1 of the central portion in the top-to-bottom direction toward the height H2 of the end portions. The first front lower lightening hole portion 12a in the central portion is formed in a rectangular shape. In the front lower lightening hole portions 12, the second front lower lightening hole portions 12b and the third front lower lightening hole portions 12c other than the first front lower lightening hole portion 12a are formed in the same manner as the front upper lightening hole portions 11, so that the height H12a close to the central portion of the support bar 1 is greater than the height H12b close to the connecting portions 2, 2, and thus, the portions 12b and 12c are formed in a trapezoidal shape which is long in the transverse direction. In other words, the second front lower lightening hole portions 12b and the third front lower lightening hole portions 12c are formed so as to be inclined so that the lower wing portion 10g becomes lower with respect to the horizontally-extending intermediate plate portion 10e from the central portion of the support bar 1 toward the connecting portions 2, 2. Thus, the pair of left and right second front lower lightening hole portions 12b and the pair of left and right third front lower lightening hole portions 12c are symmetrically disposed in a symmetrical shape in the left-to-right direction with respect to the first front lower lightening hole portion 12a.

As shown in FIGS. 4A and 4B, in the front lower lightening hole portions 12, first rear lower lightening hole portions 14a, the second front lower lightening hole portions 12b, second rear lower lightening hole portions 14b, and the third front lower lightening hole portions 12c are formed in this order from the first front lower lightening hole portion 12a toward the neck portions 1e on the left and right with respect to the first front lower lightening hole portion 12a disposed in the central portion of the support bar 1 as seen in a transverse cross-sectional view. Thus, the front lower lightening hole portions 12, as seen in the transverse cross-sectional view, are continuously formed in a concave-convex shape so as to become smaller in size from the central portion toward the neck portions 1e, in such a manner that the first front lower lightening hole portion 12a having the longest length L2 in the front-to-rear direction is disposed in the central portion and the third front lower lightening hole portions 12c having the shortest length L3 in the front-to-rear direction are disposed close to the left and right neck portions 1e.

(Configuration of Rear Upper Lightening Hole Portion)

As shown in FIG. 3B, the rear upper lightening hole portions 13 include the plural lightening hole portions 10 formed in the longitudinal direction in a rear upper portion 1c of the support bar 1 and continuously staggered in the front-to-rear direction with respect to the front upper lightening hole portions 11. As shown in FIG. 4B, the rear upper lightening hole portions 13 (13a to 13c), as seen in the transverse cross-sectional view, are formed symmetrical to the above-described front lower lightening hole portions 12 (see FIG. 4A) disposed in the front lower side. Thus, detailed description will be omitted.

(Configuration of Rear Lower Lightening Hole Portion)

As shown in FIG. 4A, the rear lower lightening hole portions 14 include the plural lightening hole portions 10 formed in the longitudinal direction in a rear lower portion 1d of the support bar 1 and staggered with respect to the rear upper lightening hole portions 13 (see FIG. 4B) and the front lower lightening hole portions 12. The rear lower lightening hole portions 14 (14a, 14b), as seen in the transverse cross-sectional view, are formed symmetrical to the above-described front upper lightening hole portions 11 (see FIG. 3B) disposed in the front upper side. Thus, detailed description will be omitted.

(Configuration of Sidewall)

As shown in FIG. 1, the sidewalls 10c are partition walls formed on left and right inner side surfaces of the lightening hole portions 10 as seen from the front-to-rear direction, and are formed in the top-to-bottom direction. As shown in FIG. 3B, the sidewalls 10c are formed so that the sidewalls 10c are expanded in an opposite direction to the adjacent respective lightening hole portions 10 (see FIG. 4A). A plate thickness of the sidewall 10c is formed so that the thickness is of the order of 2 mm in the same manner as a plate thickness T2 of the rib portion 10f to be described later.

(Configuration of Corner Portion)

As shown in FIGS. 5A to 5C, in the support bar 1, the corner portions 10d are always provided with the curves Ra, Rb or the spherical curved surface Rc. In the support bar 1, the curves Ra, Rb or the spherical curved surface Rc (see FIG. 6) is formed in the corner portions 10d thereby to prevent stresses from locally concentrating when the corner portions 10d are loaded by external forces.

As shown in FIGS. 5A to 5C, the curves Ra having R approximately equal to 0.5, for example, are formed in the corner portions 10d on outer sides of the lightening hole portions 10.

The curves Rb are formed in the corner portions 10d which form sides of the wing portions 10g of the lightening hole portions 10 and sides of the rib portions 10f (or the inner bottom portions 10b). For example, the curve Rb is greater than the curve Ra and has a radius of curvature in which R=1 mm or R>1 mm (preferably, R=1 mm to 3 mm).

Moreover, as shown in FIG. 6, the spherical curved surfaces Rc are formed in the corner portions 10d at which the rib portions 10f (or the inner bottom portions 10b), the sidewalls 10c and the intermediate plate portion 10e of the lightening hole portions 10 intersect one another, and in the corner portions 10d at which the rib portions 10f (or the inner bottom portions 10b), the rib portions 10f and the wing portions 10g intersect one another. The spherical curved surface Rc has a radius of curvature in which R=1 mm or R>1 mm (preferably, R=1 mm to 3 mm).

(Configuration of Intermediate Plate Portion)

Figure 2B:
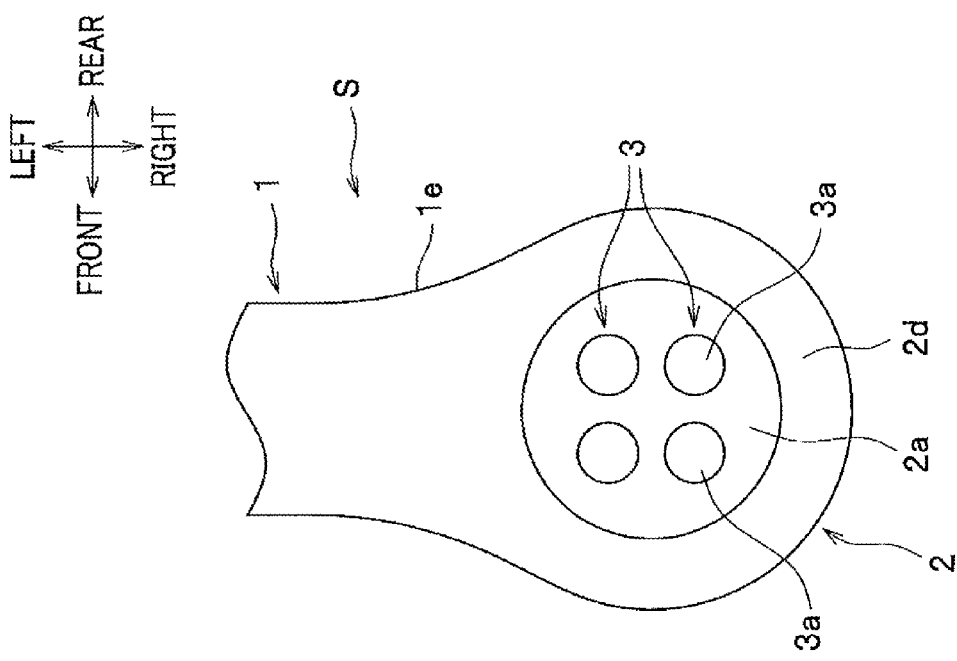
FIG. 2B is an enlarged bottom view of a connecting portion of the suspension arm member.
Figure 2A:
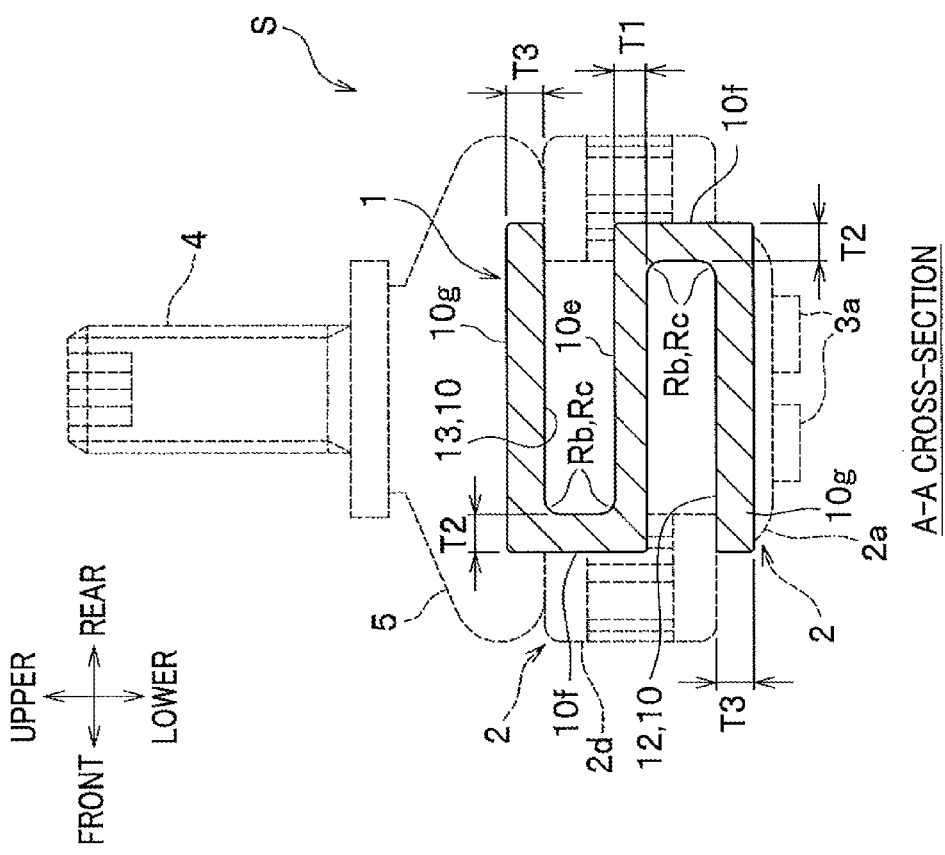
FIG. 2A is an enlarged cross-sectional view taken along the line A-A of FIG. 1.

As shown in FIG. 2A, the intermediate plate portion 10e is a part in the form of a thick plate, horizontally disposed in the central portion, in the top-to-bottom direction, of the support bar 1 formed in substantially the S-shape or in substantially the inverted S-shape as seen in the cross-sectional view in the widthwise direction. The intermediate plate portion 10e is disposed in the central portion of the support bar 1 as seen in the vertical sectional view, and thus, the intermediate plate portion 10e is disposed at a position where it, when loaded by an external force, is not loaded by large moment, which in turn enables reducing a thickness. Thus, the intermediate plate portion 10e is formed with a plate thickness T1 of 2 mm or more and is formed thinner than the wing portion 10g. More specifically, the intermediate plate portion 10e is formed with a plate thickness T1 of the order of 2.1 mm, for example.

(Configuration of Rib Portion)

As shown in FIGS. 5A to 5C, the rib portions 10f are parts each in the form of a thick plate, formed so as to extend in opposite directions (or in an upward direction or a downward direction) from ends of the intermediate plate portion 10e in a direction orthogonal to the intermediate plate portion 10e, and the rib portions 10f are formed between the intermediate plate portion 10e and the wing portions 10g. The rib portion 10f is thinner than the intermediate plate portion 10e and is formed with a plate thickness T2 of the order of 2.0 mm, for example.

(Configuration of Wing Portion)

As shown in FIGS. 5A to 5C, the wing portions 10g are parts each in the form of a thick plate, formed from distal ends of the rib portions 10f in a direction orthogonal to the rib portions 10f and formed parallel to the intermediate plate portion 10e. The wing portions 10g, when loaded by an external force, are subjected to larger moment than that applied to the intermediate plate portion 10e, by an amount away from the central portion, and thus, the wing portions 10g are formed thicker than the intermediate plate portion 10e. In a specific example, the wing portions 10g are formed with a plate thickness T3 of 3.0 mm.

The support bar 1 is formed so that the lightening hole portions 10 satisfy the following equation:

$$T1 < T3 < T2$$

where T1 represents the plate thickness of the intermediate plate portion 10e (which is equal to or more than 2 mm, or preferably is 2 to 3 mm), T2 represents the plate thickness of the rib portion 10f (which is equal to or more than 1 mm, or preferably is 1 to 2 mm), and T3 represents the plate thickness of the wing portion 10g (which is equal to or more than 3 mm, or preferably is 3 to 4 mm).

(Configuration of End Lightening Hole Portion)

As shown in FIG. 1 and FIGS. 3A and 3B, the end lightening hole portions 15 are recesses formed for purposes of the weight reduction of the suspension arm member S, as is the case with the above-described lightening hole portions 10. The end lightening hole portions 15 are formed extending from the vicinity of the neck portions 1e at the ends of the support bar 1 to flange portions 2d formed on outer peripheries of the connecting portions 2 via left and right partition walls 15a. The end lightening hole portions 15 each formed in a shape of a recessed portion are formed of the left and right partition walls 15a which form partitions in the left-to-right direction, upper and lower wall portions 15b which form walls in the top-to-bottom direction, and front and rear partition walls 15c which form partitions in the front-to-rear direction.

In the end lightening hole portions 15, the left and right partition walls 15a and the front and rear partition walls 15c are formed with substantially the same thickness (for example, a thickness of the order of 2 mm) and are formed thinner than a thickness (for example, about 3 mm) of the upper and lower wall portions 15b.

The left and right partition walls 15a are formed of standing walls in the form of flat plates, formed straight in the front-to-rear direction at a predetermined distance from ends of the front and rear partition walls 15c in the left-to-right direction and an outer peripheral portion of the housing portion 2a.

The upper and lower wall portions 15b are horizontal walls which form upper and lower surfaces of the neck portions 1e of the support bar 1 and the flange portions 2d of the connecting portions 2, and are formed continuously from the above-described wing portions 10g in the left-to-right direction.

The front and rear partition walls 15c are vertical walls which partition frontward and rearward the end lightening hole portions 15 formed in a back-to-back relation in the front-to-rear direction, and are formed along the centerline of the support bar 1, as seen in the plan view.

(Configuration of Connecting Portion)

As shown in FIG. 1, the connecting portions 2, 2 are parts to connect suspension members, and are formed in the end portions, respectively, of the support bar 1. The connecting portion 2 includes the housing portion 2a substantially in a shape of a container, integrally formed with each end portion of the support bar 1, a recessed portion 2b formed within the housing portion 2a, a mounting hole 2c formed in an inner bottom of the recessed portion 2b, and the flange portion 2d formed on the outer peripheral portion of the housing portion 2a. For example, the right connecting portion 2 is formed in a symmetrical shape with respect to the left connecting portion 2.

The housing portion 2a is a part to which the ball seat 3 rotatably supporting the ball portion 4a of the stud bolt 4 is fitted, and the housing portion 2a is formed in substantially a bottomed cylindrical shape.

The recessed portion 2b is formed of a cylindrical-shaped recess, and is formed in a direction orthogonal to a direction in which the support bar 1 extends.

The mounting hole 2c is a through-hole into which a rivet-shaped heat caulking portion 3a formed on and protruding from a lower end surface of the ball seat 3 is inserted and mounted, and the plural mounting holes 2c are formed.

The flange portion 2d is a reinforcing part substantially in the form of a thick plate, formed on the outer peripheral portion of the housing portion 2a, and is formed in substantially a C-ring shape as seen in the plan view. The flange portion 2d is formed on the outer peripheral portion of the housing portion 2a thereby to keep strength of the connecting portion 2. In the flange portion 2d, the end lightening hole portion 15 (see FIG. 5D) is formed open in the front-to-rear direction.

(Configuration of Seat Ball)

The ball seat 3 is a bearing member which forms a pivot bearing rotatably journaling the ball portion 4a of the stud bolt 4. The ball seat 3 includes the plural rivet-shaped heat caulking portions 3a, an oil reservoir 3b for reserving lubricating oil, a spherical surface portion 3c formed for adaptation to the shape of the ball portion 4a, and a flange portion 3d disposed on an open edge of the recessed portion 2b.

(Configuration of Stud Bolt)

The stud bolt 4 is a metallic bolt which functions as a stem portion rotatably disposed in the connecting portion 2 and as a connecting bolt. The stud bolt 4 includes the ball portion 4a formed on a proximal end side and forming a ball joint, a boot engagement groove 4b to which a distal end opening 5a of the dust boot 5 is fitted, and an external thread portion 4c on which an internal thread portion of the suspension member (not shown) is screwed. Note that a rotation-restraining protrusion (not shown) for preventing the connected suspension members from being loosened is formed in a proximal end portion of the external thread portion 4c.

(Configuration of Dust Boot)

The dust boot 5 is a boot made of rubber, covering an upper outer peripheral portion of the ball portion 4a, and is disposed in the ball seat 3 and the stud bolt 4 in such a manner that it is shrinkable in the top-to-bottom direction and in the left-to-right direction. The dust boot 5 includes the distal end opening 5a formed on the distal end side, a proximal end opening 5b formed on the proximal end side, and a deformable cover portion 5c formed between the distal end opening 5a and the proximal end opening 5b. Grease for the ball joint for lubricating the ball portion 4a is injected into the dust boot 5.

(Functions)

Next, description will be given with reference to the accompanying drawings with regard to functions of the suspension arm member S according to the embodiment of the present invention.

The support bar 1 of the suspension arm member S shown in FIG. 1 is formed by resin molding the resin material including the fiber reinforcement material added thereto and including the engineering plastic or the super engineering plastic containing any of PA 66, PA 6, PPS, and POM. Thus, the support bar 1 has strength, rigidity, and heat resistance. The support bar 1 includes the plural lightening hole portions 10 and end lightening hole portions 15 formed in the shape of the recessed portions and is made of the resin material, which thus enables reducing the resin material for the support bar 1 by the amount of lightening and hence achieving a weight reduction and a cost reduction. Moreover, the support bar 1 can improve the strength by a partition part in which the lightening hole portions 10 are formed.

As shown in FIG. 1 and FIGS. 3A and 3B, moreover, the lightening hole portions 10 include the front upper lightening hole portions 11 formed in the longitudinal direction in the front upper portion 1a of the support bar 1, the front lower lightening hole portions 12 formed in the front lower portion 1b of the support bar 1 and staggered in the top-to-bottom direction with respect to the front upper lightening hole portions 11, the rear upper lightening hole portions 13 formed in the rear upper portion 1c of the support bar 1 and staggered in the front-to-rear direction with respect to the front upper lightening hole portions 11, and the rear lower lightening hole portions 14 formed in the rear lower portion 1d of the support bar 1 and staggered with respect to the rear upper lightening hole portions 13 and the front lower lightening hole portions 12.

Thus, the suspension arm member S includes the arrangement of the lightening hole portions 10 formed in the front and the rear of the support bar 1 and staggered in the top-to-bottom direction and in the longitudinal direction, which in turn enables reducing the resin material for the support bar 1 by the amount of lightening and hence achieving the cost reduction and the weight reduction.

Moreover, in the support bar 1, the lightening hole portions 10 and the end lightening hole portions 15 formed in large numbers are symmetrically disposed about the centerline in the top-to-bottom direction and in the left-to-right direction, and thus, if the support bar 1 is loaded by an external force, the entire support bar 1 can absorb the external force in a well-balanced manner.

As shown in FIGS. 5B and 5C, in the support bar 1, the parts in which the lightening hole portions 10 are formed are formed in substantially the S-shape or in substantially the inverted S-shape, as seen in the cross-sectional view in the widthwise direction, which thus enables an improvement in rigidity of the lightening hole portions 10.

As shown in FIG. 2A, the lightening hole portions 10 are formed so that the plate thickness T1 of the intermediate plate portion 10e, the plate thickness T2 of the rib portion 10f and the plate thickness T3 of the wing portion 10g satisfy the following equation: T1<T3<T2, and thus, during resin molding, resin fluidity can be applied to requirements for higher strength. Thus, the support bar 1 having rigidity can be achieved.

As shown in FIG. 3B, in the lightening hole portions 10, the sidewalls 10c formed extending from the openings 10a to the inner bottom portions 10b of the lightening hole portions 10 are formed so as to have the angle θ of inclination such that the sidewalls 10c are expanded to the openings 10a in the fan shape as seen in the cross-sectional view. Thus, the support bar 1 enables easy removal of a mold after the resin molding and hence eliminating formation of burr or the like and also enables improving workability of mold operation.

Moreover, the sidewalls 10c are formed so as to be expanded in the opposite direction to the adjacent respective lightening hole portions 10, which thus enables the resin molding so as to suppress the falling down of the wing portions 10g at an open end side by a truss effect and also enables ensuring uniform strength in an axial direction.

As shown in FIG. 1, moreover, the stud bolts 4, 4 disposed on the ends of the support bar 1 are screwed to the internal thread portions of the suspension members (not shown), and thereby, the suspension arm member S is connected to the suspension members and disposed in a lower portion of the vehicle body. Thus, even if mud and sand or the like enters into the lightening hole portions 10 during the travel of the automobile, the lightening hole portions 10 are formed so as to have an angle θ of inclination of 91 to 100 degrees such that the lightening hole portions 10 are expanded, which in turn enables automatic elimination of the mud and sand or the like by vibrations from the automobile.

Then, when the automobile travels, the support bar 1 is loaded by external forces in the top-to-bottom and left-to-right directions and in a direction of rotation with the suspension members interposed in between.

As shown in FIG. 3B, moreover, the corner portions 10*d* of the lightening hole portions 10 are rounded with their respective predetermined radii of curvature (the curves Ra, Rb or the spherical curved surface Rc), which thus enables suppressing a situation where stresses concentrate at the corner portions 10*d* and hence break the corner portions 10*d* when other members or the like collides against the corner portions 10*d* during the travel of the automobile.

It is to be understood that the present invention is not limited to the above-described embodiment, various modifications and changes could be made thereto within the scope of the technical concept of the invention, and the present invention, of course, embraces such modified and changed inventions.

In the above-described embodiment, the description has been given, giving the stabilizer link as an example of the suspension arm member S; however, any member will do as long as it is an arm-shaped member for use in the suspension, and its application or installed position or the like is not particularly limited.

Moreover, anything may be adopted as the support bar 1 as long as it includes the front upper lightening hole portions 11, the front lower lightening hole portions 12, the rear upper lightening hole portions 13 and the rear lower lightening hole portions 14, and the number, size and shape of the lightening hole portions 10 may be appropriately changed according to the size of the suspension arm member S, or the like.

For example, if the support bar 1 is large in size, according to the size of the support bar 1, the number of the lightening hole portions 10 in the left-to-right direction may be increased, or the lightening hole portions 10 may be appropriately increased in three, four or five stages or the like in the top-to-bottom direction.

REFERENCE SIGNS LIST

1: support bar
1*a*: front upper portion
1*b*: front lower portion
1*c*: rear upper portion
1*d*: rear lower portion
2: connecting portion
10: lightening hole portion
10*a*: opening
10*b*: inner bottom portion
10*c*: sidewall
10*d*: corner portion
10*e*: intermediate plate portion
10*f*: rib portion
10*g*: wing portion
11: front upper lightening hole portion
12: front lower lightening hole portion
13: rear upper lightening hole portion
14: rear lower lightening hole portion
Ra, Rb: curves
Rc: spherical curved surface
S: suspension arm member
T1: plate thickness of intermediate plate portion
T2: plate thickness of rib portion
T3: plate thickness of wing portion
θ: angle of inclination

The invention claimed is:

1. A suspension arm member comprising:
a connecting portion configured to connect a plurality of members of a suspension mounted on a vehicle; and
a support bar provided with the connecting portion at each end and extending in a longitudinal direction,
wherein the support bar is made of a resin material and comprises a plurality of lightening hole portions each formed in a shape of a recessed portion in a direction orthogonal to the longitudinal direction, and
wherein the lightening hole portions comprise:
a plurality of front upper lightening hole portions formed in the longitudinal direction in a front upper portion of the support bar,
a plurality of front lower lightening hole portions formed in the longitudinal direction in a front lower portion of the support bar and staggered in a top-to-bottom direction with respect to the front upper lightening hole portions,
a plurality of rear upper lightening hole portions formed in the longitudinal direction in a rear upper portion of the support bar and staggered in a front-to-rear direction with respect to the front upper lightening hole positions,
a plurality of rear lower lightening hole portions formed in the longitudinal direction in a rear lower portion of the support bar and staggered with respect to the rear upper lightening hole portions and the front lower lightening hole portions, and
wherein parts of the support bar in which the lightening hole portions are formed in an S-shape or in an inverted S-shape, as seen in a cross-sectional view in a widthwise direction.

2. The suspension arm member according to claim 1, wherein the lightening hole portions are provided with sidewalls, and the sidewalls are formed so as to extend from openings to inner bottom portions of the lightening hole portions and so as to have an angle of inclination such that the sidewalls are expanded to the openings.

3. The suspension arm member according to claim 2, wherein the sidewalls are formed so that the sidewalls are expanded in an opposite direction to the adjacent respective lightening hole portions.

4. The suspension arm member according to claim 1, wherein corner portions of the lightening hole portions are rounded with their respective predetermined radii of curvature.

5. The suspension arm member according to claim 1, wherein the resin material comprises engineering plastic or super engineering plastic containing any of PA (polyamide) 66, PA 6, PPS (polyphenylene sulfide), and POM (polyoxymethylene).

6. The suspension arm member according to claim 5, wherein the resin material comprises a fiber reinforcement material added thereto.

7. A suspension arm member comprising:
a connecting portion configured to connect a plurality of members of a suspension mounted on a vehicle; and a support bar provided with the connecting portion at each end and extending in a longitudinal direction, wherein the support bar is made of a resin material and comprises a plurality of lightening hole portions each formed in a shape of a recessed portion in a direction orthogonal to the longitudinal direction, and wherein the lightening hole portions comprise:

a plurality of front upper lightening hole portions formed in the longitudinal direction in a front upper portion of the support bar, a plurality of front lower lightening hole portions formed in the longitudinal direction in a front lower portion of the support bar and staggered in a top-to-bottom direction with respect to the front upper lightening hole portions, a plurality of rear upper lightening hole portions formed in the longitudinal direction in a rear upper portion of the support bar and staggered in a front-to-rear direction with respect to the front upper lightening hole portions, a plurality of rear lower lightening hole portions formed in the longitudinal direction in a rear lower portion of the su ort bar and staggered with resect to the rear upper lightening hole portions and the front lower lightening hole portions, and wherein parts in which the lightening hole portions are formed comprise:

an intermediate plate portion disposed in a central portion as seen in the cross-sectional view in the widthwise direction, rib portions formed so as to extend in opposite directions from ends of the intermediate plate portion in a direction orthogonal to the intermediate plate portion, and wing portions formed so as to extend from distal ends of the rib portions and parallel to a direction orthogonal to the rib portions, wherein the lightening hole portions are formed so that the following equation is satisfied:

$$T1 < T3 < T2$$

where $T1$ represents a plate thickness of the intermediate plate portion, $T2$ represents a plate thickness of the rib portion, and $T3$ represents a plate thickness of the wing portion.

8. A suspension arm member comprising:

a connecting portion configured to connect a plurality of members of a suspension mounted on a vehicle; and a support bar provided with the connecting portion at each end and extending in a longitudinal direction, wherein the support bar is made of a resin material and comprises a plurality of lightening hole portions each formed in a shape of a recessed portion in a direction orthogonal to the longitudinal direction, and wherein the lightening hole portions comprise:

a plurality of front upper lightening hole portions formed in the longitudinal direction in a front upper portion of the support bar, a plurality of front lower lightening hole portions formed in the longitudinal direction in a front lower portion of the support bar and staggered in a top-to-bottom direction with respect to the front upper lightening hole portions, a plurality of rear upper lightening hole portions formed in the longitudinal direction in a rear upper portion of the support bar and staggered in a front-to-rear direction with respect to the front upper lightening hole portions, a plurality of rear lower lightening hole portions formed in the longitudinal direction in a rear lower portion of the support bar and staggered with respect to the rear upper lightening hole portions and the front lower lightening hole portions, wherein the lightening hole portions are provided with sidewalls, and the sidewalls are formed so as to extend from openings to inner bottom portions of the lightening hole portions and so as to have an angle of inclination such that the sidewalls are expanded to the openings, and wherein the angle of inclination comprises any angle in a range of 91 to 100 degrees with respect to a centerline of the support bar in the longitudinal direction.

* * * * *